May 23, 1967  J. J. KEENAN ETAL  3,321,036
COMBINATION BATHROOM SCALE AND WASTEBASKET
Filed Oct. 3, 1966
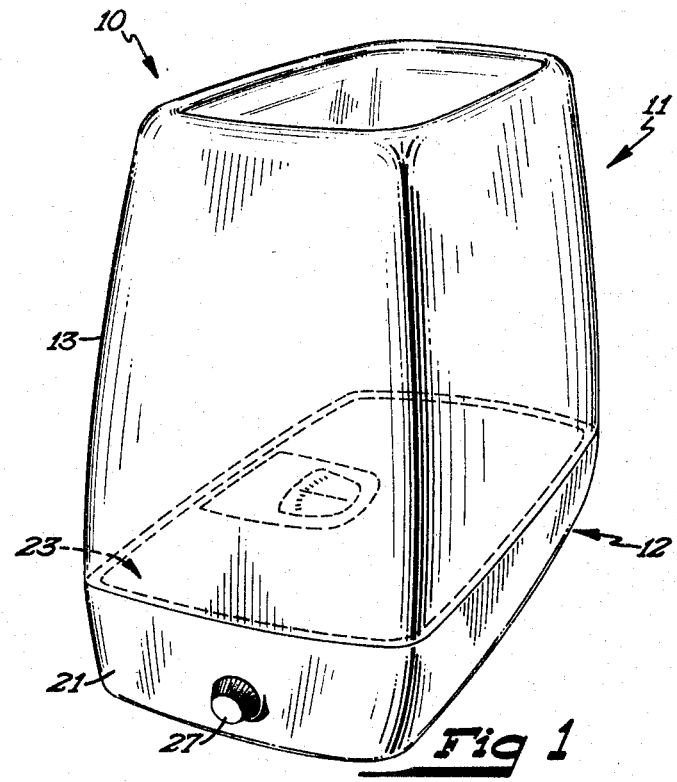
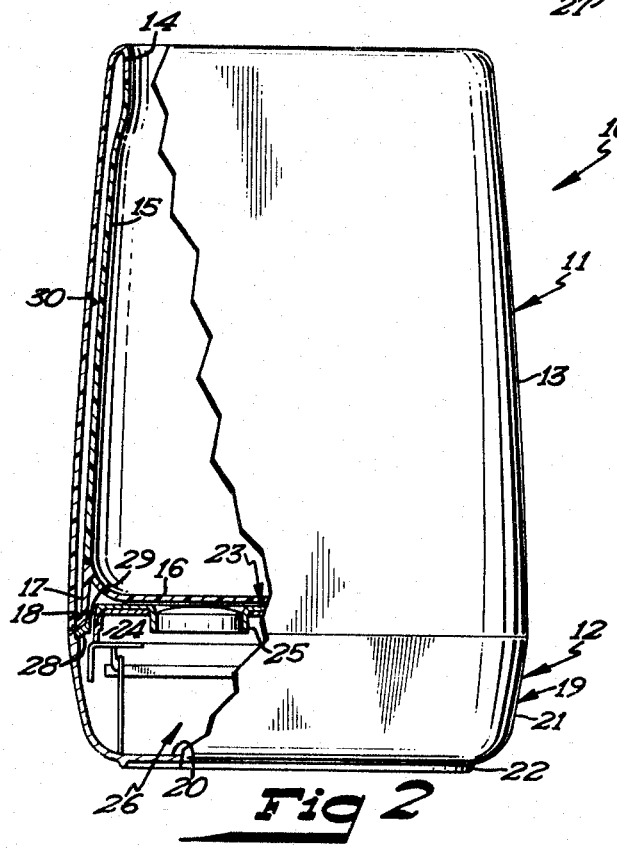
INVENTORS
JOSEPH J. KEENAN,
BERTRAND N. TROMBLEY
BY
*Williamson, Palmatier*
*& Bains*   ATTORNEYS

United States Patent Office 3,321,036
Patented May 23, 1967

3,321,036
COMBINATION BATHROOM SCALE AND WASTEBASKET
Joseph J. Keenan, Anoka, Minn., and Bertrand N. Trombley, Bloomfield Hills, Mich., assignors to West Bend Thermo-Serv, Inc., Anoka, Minn., a corporation of Minnesota
Filed Oct. 3, 1966, Ser. No. 583,744
4 Claims. (Cl. 177—245)

This invention relates to a combination bathroom scale and wastebasket apparatus.

Common accessories to bathrooms are wastebaskets and scales, and although these objects are of relatively small compass, they do in fact take up a certain amount of space. The bathrooms in many home dwellings are of relatively compact construction, and require the economic use of space therein.

It is therefore a general object of this invention to provide a combination bathroom scale and wastebasket device, of simple and inexpensive construction, in which the wastebasket is normally mounted upon and constitutes a continuation of the scale housing so that the objects occupy a minimum of space.

A more specific object of this invention is the provision of a combination bathroom scale and wastebasket device, the wastebasket being normally positioned upon and interlocked with the bathroom scale housing so that the bathroom scale stabilizes the wastebasket against tipping, and the wasebasket provides a protective covering for the scale to minimize contamination of the weighing mechanism of the bathroom scale, and whereby the entire apparatus occupies a minimum of space.

These and other objects and advantages of this invention will more fully appear from the following description made in connection with the accompanying drawings wherein like reference characters refer to the same or similar parts throughout the several views, and in which:

FIG. 1 is a perspective view of the invention; and
FIG. 2 is a vertical sectional view thereof.

Referring now to the drawings, it will be seen that one embodiment of the combination bathroom scale and wastebasket apparatus, designated generally by the reference numeral 10 is there shown. This apparatus includes a wastebasket 11 and a bathroom scale 12. The wastebasket 11 includes an outer shell 13 of tubular configuration, having open top and lower ends and being formed of a suitable, rigid, thermoplastic material, preferably acrylonitrile butadiene styrene. It will be noted that this outer shell 13 is uniformly and symmetrically tapered from its bottom end towards the upper end thereof. A relatively small outturned annular flange 14 is integrally formed with the upper peripheral edge of the imperforate outer shell 13 and extends interiorly of the outer shell in a downwardly and inwardly direction.

The wastebasket 11 also includes an inner shell 15 also formed of the same thermoplastic material as the outer shell 13 preferably acrylonitrile butadiene styrene. This inner shell 15 has open upper and lower ends and is similar in shape to the outer shell, being upwardly tapered, but being of smaller cross-sectional size than the outer shell. The upper peripheral edge of the inner shell 15 is sealingly secured to the lower peripheral edge of the downturned annular flange 14 of the outer shell by a suitable adhesive such as a plasticizer, compatible solvent, glue or the like, so that the inner and outer shell are symmetrically spaced apart.

The wastebasket 11 also includes a generally concavo-convex lower wall member 16 having its concave surface facing upwardly as best seen in FIG. 2. The outer shell, inner shell and lower wall member are all of imperforate construction and it will be seen that the upper annular peripheral edge of the lower wall member engages the lower peripheral edge of the inner shell and is secured thereto by a suitable adhesive such as a solvent, plasticizer, glue or the like. To this end, it is pointed out that the lower wall member is also formed of the same or compatible thermoplastic material as the inner and outer shell, preferably acrylonitrile butadiene styrene. This lower wall member has an annular, imperforate continuous downwardly projecting flange 17 intergrally formed with the peripheral edge portion thereof and this flange projects substantially downwardly beyond the lower surface of the bottom wall member 17. It will be noted that the annular flange 17 flares downwardly and outwardly and terminates in a lower terminal portion 18 which flares sharply outwardly and engages and is sealed to the lower peripheral edge of the outer shell 13 by suitable adhesives, such as a solvent plasticizer, plastic glue or the like. It will be noted that both the lower portion of the outer shell and the terminal portion of the annular flange 17 project downwardly beyond the lower surface of the lower wall member 16.

The bathroom scale 12 also includes a housing 19 comprised of a bottom wall 20 which as shown is of substantially flat, rectangular configuration and having a continuous peripheral wall 21 integrally formed therewith and projecting upwardly and flaring outwardly slightly therefrom. It is pointed out that the scale housing 19 is preferably formed of the same thermoplastic material as the wastebasket 11, such as acrylonitrile butadiene styrene. The housing 19 has a pair of spaced apart downwardly projecting ribs integrally formed therewith which defines legs 22 to support the lower wall 20 of the housing from the surface upon which the apparatus is positioned.

The scale 12 also includes a weighing platform 23 which is also of substantially rectangular configuration but being dimensioned smaller than the scale housing 12 to be positioned interiorly thereof as best seen in FIG. 2. The weighing platform 23 has a continuous downturned annular flange 24 integrally formed therewith and suitable reinforcing ribs 25 are integrally formed with the weighing platform, and traverse and are interconnected with the annular flange 24 to provide the desirable strength characteristics to the weighing platform. This weighing platform may be formed of a suitable thermoplastic material or, alternatively, may be formed of a suitable rigid metallic material if desired.

The weighing platform 23 is supported upon the weight sensing and indicating mechanism 26, which is positioned within the housing 19. This weighing mechanism is of conventional construction, and, per se, does not form an essential part of the present invention, and a detailed description is thought to be unnecessary for the instant application. However, it is pointed out that this weighing mechanism may be of the type used in any of the currently available commercial bathroom scale devices. The weighing mechanism may be provided with an adjustment knob 27 which is located exteriorly of the housing and which is connected by suitable connecting means to the weighing mechanism to permit ready adjustment thereof. The weighing platform will have a suitable opening therein which is provided with a transparent cover to expose the indicator scale to a user.

The scale housing 19 is provided with an annular supporting and retaining member 28 which is secured to the upper peripheral edge portion of the housing and projects inwardly and slightly upwardly therefrom. In the event that the housing 19 is formed of a thermoplastic material, such as acrylonitrile butadiene styrene, then it is preferred that the annular member 28 be formed of identical or compatible material and will be secured to the housing by an adhesive, such as a plasticizing solvent, plastic glue or the like.

The annular member 28 has the vertical lip 29 integrally formed therewith and projecting vertically therefrom, this lip being continuous and also of annular configuration. It will be noted that the inner surface of the lip 29 is positioned in close proximity to but spaced from the outer peripheral surface of the flange 24. It will also be noted that the annular member 28 is co-extensive with the upper peripheral surface of the upper edge of the housing 19. It is pointed out, that the upper surface presented by the annular member 28 and the upper peripheral edge of the continuous peripheral wall 21 corresponds to the lower surface of the terminal portion 18 of the annular flange 17. With this arrangement, the wastebasket may be positioned upon the bathroom scale so that it is supported by the annular supporting and retaining member 28.

In use, the wastebasket will normally be mounted upon the scale 12 until it is desirable to use the bathroom scale or it is desirable to empty the contents of the wastebasket. When the wastebasket is mounted upon the bathroom scale, the lower terminal portion 18 of the flange 17 will be positioned upon the upper surface of the annular supporting and retaining member 28, and the upper peripheral edge of the peripheral wall 21. The outer shell 13 of the wastebasket will be disposed in co-extensive relation with respect to the outer surface of the housing 19. The lip 29 will engage the inner surface of the flange 27 to retain the wastebasket against accidental lateral displacement and the lower surface of the lower wall member 16 will be spaced above the scale platform 23. When so mounted on the bathroom scale 12, the wastebasket 11 will be releasably interlocked with the bathroom scale, and since the bathroom scale is substantially heavier than the wastebasket, the entire apparatus will be stabilized against tipping.

The wastebasket will also serve to cover and shield the annular space between the lip 29 and the annular flange 24 of the weighing platform to prevent the entry of debris and the like. The lower wall member 16 of the wastebasket also serves to cover and protect the weighing platform 23 when in covered relation. It will be noted that since the wall of the scale housing 19 is co-extensive with the outer shell, the entire assembled apparatus simulates a single receptacle. Further, through this unique arrangement, the assembled apparatus will occupy less surface area and volumetric space than if the wastebasket and bathroom scale were placed at separate sites.

Referring again to FIG. 2, it will be noted that the inner shell of the wastebasket is spaced from the outer shell 13 thereof, so that a volumetric space 30 of generally tubular or annular configuration is defined therebetween. With this arrangement, the outer shell may be formed of a transparent material and the inner surface thereof may be provided with suitable decorative patterns thereon. Similarly, the exterior surface of the inner shell may be painted or alternatively decorated with suitable decorative patterns. By constructing the wastebasket 11 in this particular manner, the inner and outer shells may be separately decorated prior to assembly. Further, the decorative coats will be protected since these coats will be shielded from the exterior.

From the foregoing description, it will be seen that I have provided a novel wastebasket and bathroom scale device which is arranged and constructed so that the wastebasket may be mounted in superimposed relation on the bathroom scale, but which may be readily removed therefrom. It will be noted from the preceding paragraphs, that the wastebasket is not only firmly, but releasably interlocked against tipping, but the wastebasket also serves to shield and protect the bathroom scale when mounted thereon.

Thus, it will be seen that I have provided a novel combination weighing scale and wastebasket apparatus, which is not only of simple and inexpensive construction, but one which functions in a more efficient manner than any heretofore known comparable apparatus.

It will, of course, be understood that various changes may be made in the form, details, arrangement and proportions of the various parts without departing from the scope of my invention.

What is claimed is:

1. A combination wastebasket and bathroom scale device, comprising a wastebasket including an imperforate tubular outer shell having open upper and lower ends, an imperforate tubular inner shell having open upper and lower ends, means sealingly joining the upper peripheral edges of the inner and outer shells so that said inner shell is spaced symmetrically inwardly of the outer shell, a concavo-convex lower wall member having its concave surface facing upwardly and having an annular flange integrally formed with the peripheral portion and extending downwardly and outwardly therefrom, means securing the upper peripheral edge of the lower wall member with the lower peripheral edge of the inner shell member, means for securing the lower edge of said outer shell and said last-mentioned flange, the lower edge of said outer shell and said flange on said lower wall member projecting downwardly beyond said lower wall member, said inner shell, outer shell and bottom wall member being formed of a plastic material, a scale device including a scale housing having a bottom wall with an upstanding peripheral wall secured thereto and being formed of a plastic material, a weighing platform positioned interiorly of the upstanding peripheral wall of said scale.

weighing mechanism in said housing and supporting said weighing platform, an annular retaining and supporting member secured to the upper peripheral edge of said scale housing and projecting interiorly thereof, whereby the lower peripheral edge of said wastebasket, defined by the interengaging portions of said outer shell and lower wall member flange, engages and is supported by said annular retaining and supporting member, said wastebasket when in supported relation on said scale housing having the lower wall member thereof spaced above the scale platform and having its outer shell disposed in substantially co-extensive relation with respect to the peripheral wall of the scale housing.

2. The combination wastebasket and bathroom scale device as defined in claim 1 wherein said means supporting the peripheral edges of the inner and outer shell comprises an annular flange integrally formed with the upper edge of said outer shell and extending downwardly and interiorly thereof, said flange engaging the upper peripheral edge of said inner shell and being sealingly secured thereto.

3. The combination wastebasket and bathroom scale device as defined in claim 1 and an annular lip integrally formed with the inner peripheral edge of said annular retaining and supporting member and projecting upwardly therefrom.

4. The combination wastebasket and bathroom scale device as defined in claim 1 wherein the inner surface of said outer shell and the outer surface of said inner shell are uniformly spaced apart, at least one of said surfaces having ornamental decorative material affixed thereto.

References Cited by the Examiner

UNITED STATES PATENTS

| 1,737,158 | 11/1929 | Jacobs | 177—262 |
| 2,661,202 | 12/1953 | Van Duyn | 177—241 X |
| 2,931,640 | 4/1960 | Riddle | 177—262 |
| 3,279,549 | 10/1966 | Feinberg et al. | 177—241 X |

RICHARD B. WILKINSON, *Primary Examiner.*

R. S. WARD, JR., *Assistant Examiner.*